(12) United States Patent
Takami et al.

(10) Patent No.: US 7,803,483 B2
(45) Date of Patent: Sep. 28, 2010

(54) HERMETICALLY SEALED HIGH CAPACITY NONAQUEOUS ELECTROLYTE BATTERY AND BATTERY PACK WITH THE SAME

(75) Inventors: Norio Takami, Yokohama (JP); Hiroki Inagaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1308 days.

(21) Appl. No.: 11/260,435

(22) Filed: Oct. 28, 2005

(65) Prior Publication Data

US 2007/0009794 A1 Jan. 11, 2007

(30) Foreign Application Priority Data

Jul. 7, 2005 (JP) ............... 2005-199444

(51) Int. Cl.
| | |
|---|---|
| *H01M 2/02* | (2006.01) |
| *H01M 4/58* | (2006.01) |
| *H01M 4/00* | (2006.01) |
| *H01M 4/50* | (2006.01) |
| *H01M 2/18* | (2006.01) |
| *H01M 6/16* | (2006.01) |
| *H02J 7/00* | (2006.01) |

(52) U.S. Cl. ............ 429/181; 429/179; 429/231.5; 429/221; 429/223; 429/224; 429/139; 429/337; 429/338; 320/134

(58) Field of Classification Search ......... 429/122–347; 29/623.1–623.5; 320/134
See application file for complete search history.

(56) References Cited

U.S. PATENT DOCUMENTS

| | | | | |
|---|---|---|---|---|
| 6,296,967 | B1 * | 10/2001 | Jacobs et al. | ............ 429/93 |
| 6,461,757 | B1 * | 10/2002 | Sasayama et al. | ............ 429/59 |
| 2002/0182480 | A1 * | 12/2002 | Hanauer et al. | ............ 429/62 |
| 2005/0064282 | A1 | 3/2005 | Inagaki et al. | |

(Continued)

FOREIGN PATENT DOCUMENTS

JP 2001-84993 3/2001

(Continued)

OTHER PUBLICATIONS

Whittingham, MS., Lithium Batteries and Cathode Materials, Sep. 2004, Chem. Rev., vol. 104, pp. 4271-4301.*

(Continued)

*Primary Examiner*—Basia Ridley
*Assistant Examiner*—Jonathan G Leong
(74) *Attorney, Agent, or Firm*—Oblon, Spivak, McClelland, Maier & Neustadt, L.L.P.

(57) ABSTRACT

A nonaqueous electrolyte battery includes a positive electrode, a negative electrode and a case formed of a film and including a heat sealed section formed on at least one edge portion of the case. The negative electrode contains a negative electrode active material having a lithium ion insertion potential not lower than 0.4V (vs. Li/Li$^+$). The nonaqueous electrolyte battery also includes positive and negative electrode terminals. A first alumina layer having projections and recesses is formed on at least one part of a seal portion of the positive electrode terminal. A second alumina layer having projections and recesses is formed on at least one part of a seal portion of the negative electrode terminal. Further, the positive and negative electrode terminals have a cross sectional area S (mm$^2$) which satisfies $0.6Q \leqq S \leqq 2Q$.

19 Claims, 5 Drawing Sheets

U.S. PATENT DOCUMENTS

| | | |
|---|---|---|
| 2005/0069777 A1 | 3/2005 | Takami et al. |
| 2005/0221173 A1 | 10/2005 | Tatebayashi et al. |
| 2005/0221187 A1 | 10/2005 | Inagaki et al. |
| 2005/0221188 A1 | 10/2005 | Takami et al. |
| 2006/0134520 A1 | 6/2006 | Ishii et al. |
| 2008/0070115 A1 | 3/2008 | Saruwatari et al. |

FOREIGN PATENT DOCUMENTS

| | | |
|---|---|---|
| JP | 2002-42889 | 2/2002 |

OTHER PUBLICATIONS

Machine Translation of JP 2002-042889 originally published Feb. 2002 to Takami et al.*

U.S. Appl. No. 11/687,844, filed Mar. 19, 2007, Fujita, et al.
U.S. Appl. No. 11/687,860, filed Mar. 19, 2007, Fujita, et al.
U.S. Appl. No. 11/694,454, filed Mar. 30, 2007, Inagaki, et al.
U.S. Appl. No. 11/387,776, filed Mar. 24, 2006, Inagaki et al.
U.S. Appl. No. 11/230,635, filed Sep. 21, 2005, Takami, et al.
U.S. Appl. No. 11/230,482, filed Sep. 21, 2005, Takami, et al.
U.S. Appl. No. 11/470,482, filed Sep. 6, 2006, Takami, et al.
U.S. Appl. No. 11/531,142, filed Sep. 12, 2006, Morishima, et al.
U.S. Appl. No. 11/940,688, filed Nov. 15, 2007, Inagaki, et al.
U.S. Appl. No. 11/148,169, filed Jun. 9, 2005, Inagaki et al.
U.S. Appl. No. 11/228,430, filed Sep. 19, 2005, Inagaki et al.
U.S. Appl. No. 11/257,040. filed Oct. 25, 2005, Inagaki et al.
U.S. Appl. No. 11/260,410, filed Oct. 28, 2005, Inagaki et al.
U.S. Appl. No. 11/261,538, filed Oct. 31, 2005, Inagaki et al.
U.S. Appl. No. 11/756,259, filed May 31, 2007, Saruwatari, et al.
U.S. Appl. No. 12/512,540, filed Jul. 30, 2009, Inagaki, et al.

* cited by examiner

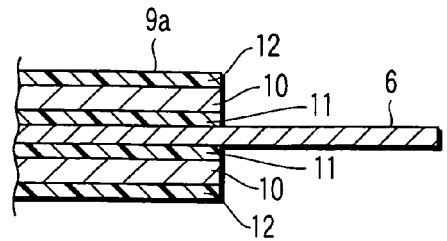
F I G. 3
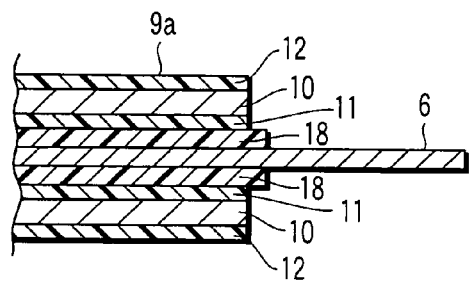
F I G. 4
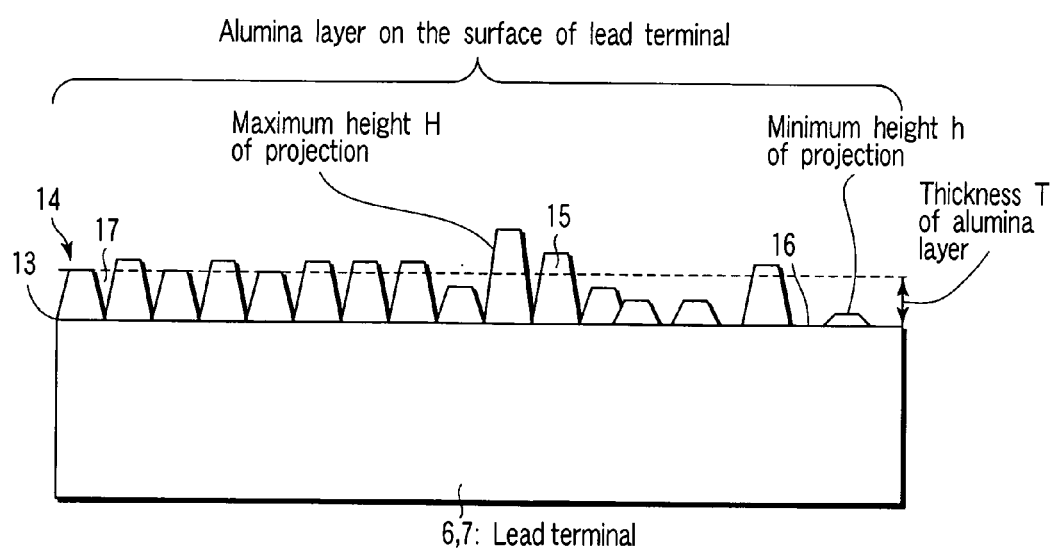
F I G. 5

HERMETICALLY SEALED HIGH CAPACITY NONAQUEOUS ELECTROLYTE BATTERY AND BATTERY PACK WITH THE SAME

CROSS-REFERENCE TO RELATED APPLICATIONS

This application is based upon and claims the benefit of priority from prior Japanese Patent Application No. 2005-199444, filed Jul. 7, 2005, the entire contents of which are incorporated herein by reference.

BACKGROUND OF THE INVENTION

1. Field of the Invention

The present invention relates to a nonaqueous electrolyte battery, a battery pack using the nonaqueous electrolyte batteries, and a vehicle having the battery pack mounted thereto.

2. Description of the Related Art

A nonaqueous electrolyte battery comprising a negative electrode containing a lithium metal, a lithium alloy, a lithium compound or a carbonaceous material attracts attentions as a battery having a high energy density, and a vigorous research is being conducted on the particular nonaqueous electrolyte battery. A lithium ion battery comprising a positive electrode containing $LiCoO_2$ or $LiMn_2O_4$ as an active material and a negative electrode containing a carbonaceous material capable of absorbing-releasing lithium has been widely put to the practical use. Also, it is studied to use a metal oxide or an alloy in place of the carbonaceous material in the negative electrode.

In general, a copper foil was used as the current collector of the negative electrode, and nickel or copper was used as it was as the terminal. For example, Japanese Patent Disclosure (Kokai) No. 2001-84993 is directed to a battery in which the external lead terminal of the positive electrode is formed of aluminum or an aluminum alloy. In the battery disclosed in this patent document, a porous oxide film is formed by a chemical treatment on the entire circumferential surface that is sealed by a film forming a case at the external lead terminal of the positive electrode. Also, according to this patent document, the negative electrode current collector is formed of copper or nickel. And in order to avoid the corrosion caused by the electrolysis solution, the external lead terminal of the negative electrode is formed of nickel.

However, if the battery comprising the negative electrode including a copper foil used as a current collector is put under an over discharge state, the potential of the negative electrode is elevated to promote the dissolving reaction of the copper foil, with the result that the discharge capacity is rapidly lowered. Such being the situation, it is necessary for the battery to include a protective circuit that is effective for preventing the battery from being put under an over discharge state. However, it is disadvantageous in view of the energy density to mount the protective circuit.

Under the circumstances, it is proposed in, for example, Japanese Patent Disclosure (Kokai) No. 2002-42889, to use an aluminum foil or an aluminum alloy foil as the negative electrode current collector, and a specified negative electrode active material. The use of the aluminum foil or the aluminum alloy foil makes it possible to provide a nonaqueous electrolyte battery exhibiting an improved energy density and an improved charge-discharge cycle performance.

On the other hand, a nonaqueous electrolyte battery using an aluminum foil or an aluminum alloy foil as a negative electrode current collector is considered hopeful as a battery mounted to a vehicle such as an assistant bicycle, an electric scooter, an electric automobile or a hybrid automobile or as an emergency power source of an electronic apparatus. The battery mounted to a vehicle is required to be charged rapidly when the battery is put under an environment of a high temperature and a high humidity for a long time, e.g., the temperature not lower than 60° C. and the relative humidity not lower than 90%, and also required to achieve the discharge with a high output.

If the case in which an electrode group is to be housed is formed of a film in order to decrease the weight of the nonaqueous electrolyte battery, the hermetic sealing performance of the case is lowered if the battery is used for a long time under a high temperature environment. As a result, the water permeates into the case to bring about problems that the discharge capacity is lowered and that the charge-discharge cycle performance is lowered.

BRIEF SUMMARY OF THE INVENTION

An object of the present invention is to provide a nonaqueous electrolyte battery excellent in the charge-discharge cycle characteristics under an environment of a high temperature and a high humidity, a battery pack using the nonaqueous electrolyte battery, and a vehicle having the battery pack mounted therein.

According to a first aspect of the present invention, there is provided a nonaqueous electrolyte battery, comprising:

a case formed of a film and including a heat sealed section formed on at least one edge portion of the case;

a nonaqueous electrolyte provided in the case;

a positive electrode provided in the case;

a negative electrode provided in the case and containing a negative electrode active material having a lithium ion insertion potential not lower than 0.4V (vs. $Li/Li^+$);

a positive electrode terminal including a tip portion withdrawn to an outside of the case via the heat sealed section of the case, and a seal portion being positioned in the heat sealed section, and the positive electrode terminal being made of aluminum or aluminum alloy;

a first alumina layer having projections and recesses and formed on at least one part of the seal portion of the positive electrode terminal;

a negative electrode terminal including a tip portion withdrawn to the outside of the case via the heat sealed section of the case, and a seal portion being positioned in the heat sealed section, and the negative electrode terminal being made of aluminum or aluminum alloy; and a second alumina layer having projections and recesses and formed on at least one part of the seal portion of the negative electrode terminal;

wherein the positive electrode terminal and the negative electrode terminal have a cross sectional area S ($mm^2$) which satisfies the formula (1) given below:

$$0.6Q \leq S \leq 2Q \quad (1)$$

where Q denotes a rated capacity (Ah) of the nonaqueous electrolyte battery, which falls within a range of 1 to 50 Ah.

According to a second aspect of the present invention, there is provided a battery pack comprising nonaqueous electrolyte batteries, each of the nonaqueous electrolyte batteries comprising:

a case formed of a film and including a heat sealed section formed on at least one edge portion of the case;

a nonaqueous electrolyte provided in the case;

a positive electrode provided in the case;

a negative electrode provided in the case and containing a negative electrode active material having a lithium ion insertion potential not lower than 0.4V (vs. Li/Li$^+$);

a positive electrode terminal including a tip portion withdrawn to an outside of the case via the heat sealed section of the case, and a seal portion being positioned in the heat sealed section, and the positive electrode terminal being made of aluminum or aluminum alloy;

a first alumina layer having projections and recesses and formed on at least one part of the seal portion of the positive electrode terminal;

a negative electrode terminal including a tip portion withdrawn to the outside of the case via the heat sealed section of the case, and a seal portion being positioned in the heat sealed section, and the negative electrode terminal being made of aluminum or aluminum alloy; and a second alumina layer having projections and recesses and formed on at least one part of the seal portion of the negative electrode terminal;

wherein the positive electrode terminal and the negative electrode terminal have a cross sectional area S (mm$^2$) which satisfies the formula (1) given above.

According to a third aspect of the present invention, there is provided a vehicle including a battery pack comprising nonaqueous electrolyte batteries, each of the nonaqueous electrolyte batteries comprising:

a case formed of a film and including a heat sealed section formed on at least one edge portion of the case;

a nonaqueous electrolyte provided in the case;

a positive electrode provided in the case;

a negative electrode provided in the case and containing a negative electrode active material having a lithium ion insertion potential not lower than 0.4V (vs. Li/Li$^+$);

a positive electrode terminal including a tip portion withdrawn to an outside of the case via the heat sealed section of the case, and a seal portion being positioned in the heat sealed section, and the positive electrode terminal being made of aluminum or aluminum alloy;

a first alumina layer having projections and recesses and formed on at least one part of the seal portion of the positive electrode terminal;

a negative electrode terminal including a tip portion withdrawn to the outside of the case via the heat sealed section of the case, and a seal portion being positioned in the heat sealed section, and the negative electrode terminal being made of aluminum or aluminum alloy; and a second alumina layer having projections and recesses and formed on at least one part of the seal portion of the negative electrode terminal;

wherein the positive electrode terminal and the negative electrode terminal have a cross sectional area S (mm$^2$) which satisfies the formula (1) given above.

BRIEF DESCRIPTION OF THE SEVERAL VIEWS OF THE DRAWING

FIG. 3 is a cross sectional view showing in a magnified fashion an example of the construction of the heat sealed section shown in FIG. 1;

FIG. 4 is a cross sectional view showing in a magnified fashion another example of the construction of the heat sealed section shown in FIG. 1;

FIG. 5 is a cross sectional view schematically showing in a magnified fashion the construction of the first seal portion of each of the positive electrode terminal and the negative electrode terminal shown in FIG. 1, the first seal portion being positioned in the sealed section of the case;

DETAILED DESCRIPTION OF THE INVENTION

Figure 1:
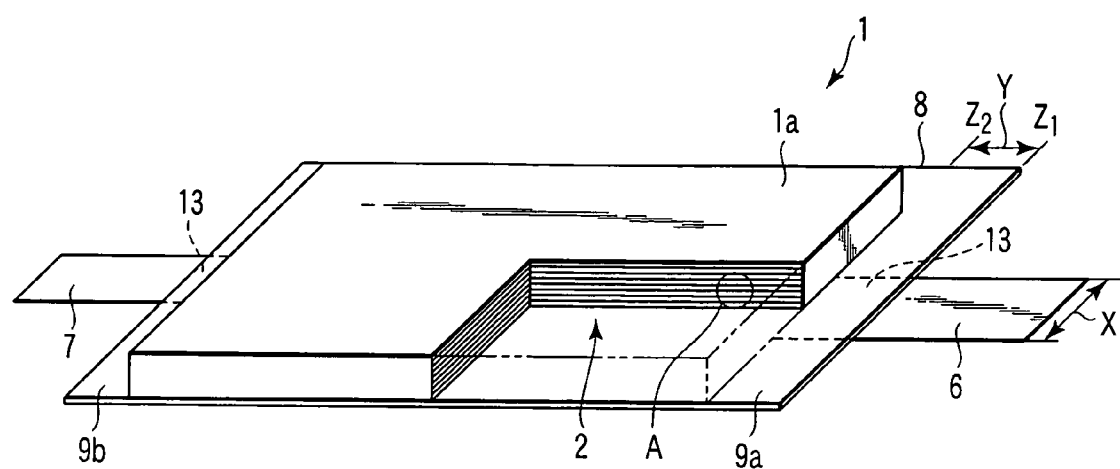
FIG. 1 is an oblique view, partly broken away, schematically showing the construction of a flat type nonaqueous electrolyte secondary battery according to a first embodiment of the present invention.

The nonaqueous electrolyte battery mounted to a vehicle or used as an emergency power source of an electronic apparatus is exposed frequently to an environment of a high temperature and a high humidity. This nonaqueous electrolyte battery has a rated capacity not smaller than 1 Ah. And the nonaqueous electrolyte battery is required to be charged rapidly and to be capable of discharge with a high output. As a result, the amount of the heat generation accompanying the charge-discharge operation of the nonaqueous electrolyte battery noted above is markedly larger than that of the nonaqueous electrolyte battery having a rated capacity smaller than 1 Ah, which is mounted to, for example, a portable telephone. It follows that, if the nonaqueous electrolyte battery having a rated capacity not smaller than 1 Ah is used under an environment of a high temperature and a high humidity, the battery temperature is markedly elevated to lower the hermetic sealing properties of the case and to lower the charge-discharge cycle performance of the nonaqueous electrolyte battery.

As a result of an extensive research, the present inventors have found that, when the nonaqueous electrolyte battery having a rated capacity of 1 to 50 Ah satisfies conditions (a) to (c) given below, it is possible to improve the bonding strength between the heat sealed section and the terminal to make it possible to suppress the lowering of the hermetic sealing properties of the case when the nonaqueous electrolyte battery is used under an environment of a high temperature and a high humidity. As a result, it is possible to improve the charge-discharge cycle characteristics of the nonaqueous electrolyte battery under an environment of a high temperature and a high humidity.

(a) Both the positive electrode terminal and the negative electrode terminal are formed of aluminum or an aluminum alloy.

(b) A porous alumina layer is formed in at least one part of the seal portion of each of the positive electrode terminal and the negative electrode terminal that is bonded to the heat sealed section.

(c) The positive electrode terminal and the negative electrode terminal have a cross sectional area S (mm$^2$) which satisfies the formula (1) given below:

$$0.6Q \leq S \leq 2Q \quad (1)$$

where Q denotes the rated capacity (Ah) of the nonaqueous electrolyte battery, which falls within a range of 1 to 50 Ah.

Each embodiment of the present invention will now be described with reference to the accompanying drawings. Incidentally, the common constituents of the embodiments described in the following are denoted by the same reference numerals to avoid the overlapping description. Also, the accompanying drawings are schematic drawings that are simply intended to facilitate the description and understanding of the present invention. Naturally, it is possible for the shape, size and ratio in the drawings to differ from those of the actual nonaqueous electrolyte battery. Needless to say, the design of the nonaqueous electrolyte battery can be changed appropriately in view of the description given below and the prior art.

First Embodiment

Figure 2:
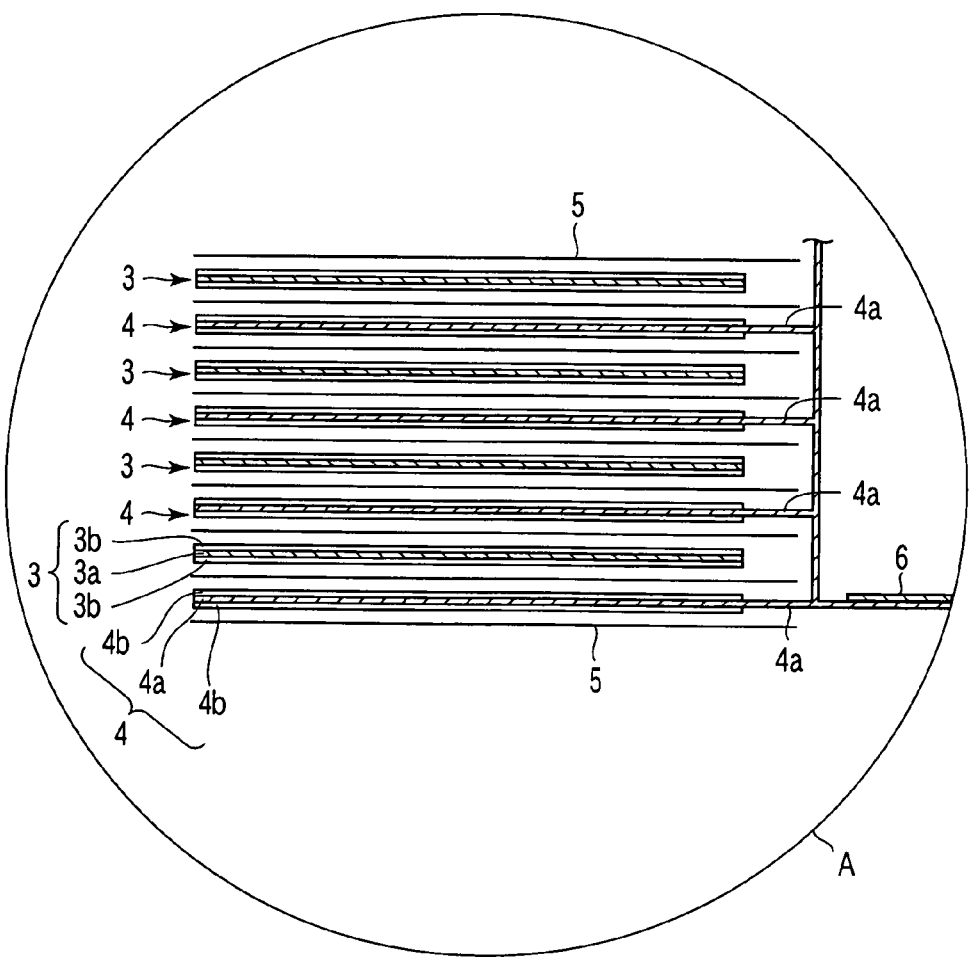
FIG. 2 is a cross sectional view showing in a magnified fashion the construction of the circular region A shown in FIG. 1.

An example of the nonaqueous electrolyte battery according to the first embodiment of the present invention will now be described with reference to FIGS. 1 to 5. FIG. 1 is an oblique view, partly broken away, schematically showing the construction of a flat type nonaqueous electrolyte secondary battery according to the first embodiment of the present invention. FIG. 2 is a cross sectional view showing in a magnified fashion the construction of the circular region A shown in FIG. 1. FIG. 3 is a cross sectional view exemplifying in a magnified fashion an example of the construction of the heat sealed section shown in FIG. 1. FIG. 4 is a cross sectional view exemplifying in a magnified fashion another example of the construction of the heat sealed section shown in FIG. 1. Further, FIG. 5 is a cross sectional view showing in a magnified fashion the construction of the first seal portion of each of the positive electrode terminal and the negative electrode terminal shown in FIG. 1, the first seal portion being positioned in the heat sealed section.

As shown in FIG. 1, a laminate type electrode group 2 is housed in a case 1 formed of a laminate film. As shown in FIG. 2, the laminate type electrode group 2 comprises a rectangular positive electrode 3, a rectangular negative electrode 4, and a rectangular separator 5 interposed between the rectangular positive electrode 3 and the rectangular negative electrode 4. The rectangular positive electrode 3 and the rectangular negative electrode 4 are alternately laminated one upon the other with the separator 5 interposed between the rectangular positive electrode 3 and the rectangular negative electrode 4. A plurality of positive electrodes 3 each comprising a positive electrode current collector 3a, and a positive electrode layer 3b supported on both surfaces of the positive electrode current collector 3a. A positive electrode active material is contained in the positive electrode layer 3b. Likewise, a plurality of negative electrodes 4 each comprising a negative electrode current collector 4a, and a negative electrode layer 4b supported on both surfaces of the negative electrode current collector 4a. A negative electrode active material is contained in the negative electrode layer 4b. One side of the negative electrode current collector 4a included in each of the negative electrodes 4 projects from the positive electrodes 3 in the long side direction. The edge portion of the negative electrode current collector 4a projecting from the positive electrodes 3 is electrically connected to a band-like negative electrode lead terminal 6. Also, one side of the positive electrode current collector 3a included in the positive electrode 3 is positioned on the side opposite to the protruding side of the negative electrode current collector 4a and is protruded from the negative electrode 4, though the particular construction is not shown in the drawing. The edge portion of the positive electrode current collector 3a projecting from the negative electrodes 4 is electrically connected to a band-like positive electrode lead terminal 7 shown in FIG. 1. Incidentally, FIG. 2 shows for convenience that the current collector 4a and the negative electrode lead terminal 6 are substantially equal to each other in thickness. However, it is possible for the negative electrode lead terminal 6 to be thicker than the current collector 4a.

It is possible for the negative electrode lead terminal 6 to be formed of a material exhibiting an electric stability and conductivity within a potential range of 0.4 to 3V relative to the lithium metal. To be more specific, it is possible for the negative electrode lead terminal 6 to be formed of an aluminum alloy containing at least one element selected from the group consisting of Mg, Ti, Zn, Mn, Fe, Cu, and Si or to be formed of aluminum. In order to decrease the contact resistance, it is desirable for the material of the negative electrode lead terminal 6 to be equal to that of the negative electrode current collector 4a.

It is possible for the positive electrode lead terminal 7 to be formed of a material exhibiting an electrical stability and conductivity within a potential range of 3 to 5V relative to the lithium metal. To be more specific, it is possible for the positive electrode lead terminal 7 to be formed of an aluminum alloy containing at least one element selected from the group consisting of Mg, Ti, Zn, Mn, Fe, Cu and Si or to be formed of aluminum. In order to decrease the contact resistance, it is desirable for the material of the positive electrode lead terminal 7 to be equal to the material of the positive electrode current collector 3a.

The case 1 will now be described. The electrode group is housed in a laminate film having a cup-shaped container section 1a formed therein. If the laminate film is folded double under the particular state, the folded portions of the laminate film are allowed to overlap each other in one edge section in the long side direction and both edge sections in the short side direction. If the overlapping portions of the laminate film are bonded to each other by the heat seal, a long side sealed section 8, a first short side sealed section 9a and a second short side sealed section 9b are formed in the peripheral portion of the case 1. As a result, obtained is the case 1 constituting a hermetically closed container. As shown in, for example, FIG. 3, the laminate film comprises a metal layer 10, a thermoplastic resin layer 11 formed on one surface of the metal layer 10, and a resin layer 12 formed on the opposite surface of the metal layer 10. The thermoplastic resin layer 11 is positioned on the inner surface of the case 1, and the resin layer 12 is positioned on the surface of the case 1. The long side sealed section 8 is formed by subjecting the overlapping portions of the thermoplastic resin layer 11 of the laminate film to the heat seal. As shown in FIG. 3, the first short side sealed section 9a is formed by applying a heat seal under the state that the negative electrode lead terminal 6 is held between the overlapping portions of the thermoplastic resin layer 11 of the laminate film. The tip portion of the negative electrode lead terminal 6 is withdrawn to the outside from the first short side sealed section 9a. On the other hand, the second short side sealed section 9b is formed by applying a heat seal under the state that the positive electrode lead terminal 7 is held between the overlapping portions of the thermoplastic resin layer of the laminate film. The tip portion of the positive electrode terminal 7 is withdrawn to the outside from the second short side sealed section 9b.

It is desirable for the metal layer 10 included in the laminate film to be formed of an aluminum foil or an aluminum alloy foil in order to decrease the weight of the laminate film. It is possible for the aluminum foil and the aluminum alloy foil to have a construction similar to that of the negative electrode current collector described herein later. It is possible for the thermoplastic resin layer 11 included in the laminate film to be formed of a polyolefin film. It is desirable to use at least one of polypropylene (PP) and polyethylene (PE) as the polyolefin. Particularly, it is desirable to use polyethylene. The resin layer 12 included in the laminate film, which is intended to reinforce the metal layer 10, can be formed of a polymer such as polyolefin, Nylon, or polyethylene terephthalate (PET). It is desirable for the laminate film to comprise a PET film or a Nylon film as the resin layer 12, an aluminum foil or an aluminum alloy foil as the metal layer 10, and a non-stretched PE film or a PP film as the thermoplastic resin layer 11, which are laminated one upon the other in the order mentioned as viewed from the outside (from the surface side of the case). Incidentally, it is possible for an adhesive layer to be formed between the metal layer 10 and the thermoplastic resin layer 11 and between the metal layer 10 and the resin layer 12 for bonding the metal layer 10 to the thermoplastic resin layer 11 and to the resin layer 12.

It is desirable for the laminate film to have a thickness not larger than 0.3 mm, more desirably to have a thickness falling within a range of 0.1 to 0.3 mm.

A second porous alumina layer 14 having projections and recesses is formed in the first seal portion (main surface seal portion) 13 of the negative electrode lead terminal 6 that is in contact with the first short side sealed section 9a. A first porous alumina layer 14 having projections and recesses is formed in the first seal portion (main surface seal portion) 13 of the positive electrode lead terminal 7 that is in contact with the second short side sealed section 9b. FIG. 5 schematically shows the construction of the first seal portion noted above. As shown in the drawing, an alumina layer 14 of each of the negative electrode lead terminal 6 and positive electrode lead terminal 7 have a projecting portion and a recess portion and is formed in the first seal portion 13. The alumina layer 14 having projections and recesses has a porous structure like sponge. To be more specific, a large number of projecting portions (projections) 15 are formed discontinuously and nonuniformly such that a large number of open cells (recesses) 16 and closed cells (recesses) 17 are formed between adjacent projecting portions 15. It is desirable for the height of the projecting portion 15 to fall within a range of 0.01 to 10 µm. Also, it is desirable for the thickness of the alumina layer 14 having projections and recesses to be not larger than 10 µm. If the thickness of the alumina layer 14 exceeds 10 µm, it is possible for the electric contact resistance to be increased. It is more desirable for the thickness of the alumina layer 14 to fall within a range of 0.01 to 1 µm. The alumina layer 14 having projections and recesses permits sufficiently increasing the bonding strength between the heat sealed section and the lead terminals. Incidentally, the thickness T of the alumina layer 14 having projections and recesses denotes the middle value between the maximum height H and the minimum height h of the projecting portion 15. The thickness T can be measured by a metallogaphic microscope observation or an electron microscope observation. It is desirable for the alumina layer 14 having projections and recesses to be formed not only in the first seal portion (main surface seal portion) 13 alone but also in a second seal portion. The second seal portion includes the side surface portion at which the negative electrode terminal 6 is in contact with the first short side sealed section 9a and the side surface portion at which the positive electrode terminal 7 is in contact with the second short side sealed section 9b. Also, it is possible for the alumina layer 14 having projections and recesses to have not only a porous structure in which cells are arranged in three dimensional directions as shown in FIG. 5 but also a porous structure in which cells are arranged in two dimensional directions like a mesh.

The alumina layer 14 having projections and recesses can be formed by applying a surface treatment to the surfaces of the negative electrode lead terminal 6 and the positive electrode lead terminal 7 or by rasping off the surfaces of the negative electrode lead terminal 6 and the positive electrode lead terminal 7 by a sand paper. The surface treatment noted above includes, for example, a chemical treatment using a chemical solution such as an etching, a plasma processing or an anodic oxidation and a physical treatment such as a blast treatment in which fine particles are allowed to collide against the surfaces of the negative electrode lead terminal 6 and the positive electrode lead terminal 7 to roughen the surfaces noted above. Such a surface treatment is applied to the entire circumferential surface of the negative electrode lead terminal 6 that is surrounded by the first short side sealed section 9a and to the entire circumferential surface of the positive electrode lead terminal 7 that is surrounded by the second short side sealed section 9b. The chemical treatment using a chemical solution includes, for example, the processing with a dichromic acid in which the negative electrode lead terminal 6 and the positive electrode lead terminal 7 are dipped in an aqueous solution containing sodium dichromate and at least one of phosphoric acid and sulfuric acid.

As shown in FIG. 4, it is possible for a thermoplastic film 18 to be interposed between the thermoplastic resin layer 11 included in the laminate film and the negative electrode lead terminal 6. It is desirable for the thermoplastic film 18 to be sized large enough to cover the alumina layer 14 formed on the first seal portion 13 of the negative electrode lead terminal 6. Where the thermoplastic film 18 is sized as pointed out above, it is possible to increase the bonding strength between the first short side sealed section 9a and the negative electrode lead terminal 6. It is also desirable for a thermoplastic film to be interposed between the positive electrode lead terminal 7 and the thermoplastic resin layer 11 included in the laminate film in order to increase the bonding strength between the second short side sealed section 9b and the positive electrode lead terminal 7.

In order to allow the thermoplastic film 18 to exhibit the characteristics and the moldability substantially equal to those of the thermoplastic resin layer 11 and, at the same time, to improve the adhesivity between the alumina layer 14 and the thermoplastic resin layer 11, it is desirable for the thermoplastic film 18 to be formed of an organic polymer film that is electrochemically stable and has a melting point of 100 to 200° C. The organic polymer film includes, for example, a film formed of a material prepared by adding an acid anhydride to polyolefin including at least one of polypropylene (PP) and polyethylene (PE). Particularly, it is desirable to use a film formed of a material prepared by grafting several percent of maleic anhydride to polyethylene. In this case, it is possible to further improve the charge-discharge cycle life of the nonaqueous electrolyte battery under an environment of a high temperature and a high humidity.

The nonaqueous electrolyte battery of the construction described above is able to satisfy formula (1) given below:

$$0.6Q \leq S \leq 2Q \quad (1)$$

where S denotes the cross sectional area (mm$^2$) of each of the positive electrode lead terminal 7 and the negative electrode lead terminal 6, and Q denotes the rated capacity (Ah), which falls within a range of 1 to 50 Ah.

The cross sectional area S noted above denotes the cross sectional area obtained when each of the positive electrode lead terminal 7 and the negative electrode lead terminal 6 is cut in the short side direction. It suffices for the cross sectional area S of the positive electrode lead terminal 7 and the cross sectional area S of the negative electrode lead terminal 6 to have a value satisfying formula (1) given above, and it is possible for the cross sectional area S of the positive electrode lead terminal 7 and the cross sectional area S of the negative electrode lead terminal 6 not to be equal to each other. Also, the rated capacity Q of the nonaqueous electrolyte battery denotes the rated capacity at the time when the nonaqueous electrolyte battery is discharged at a rate of 0.2C.

If the cross sectional area S is smaller than 0.6Q, the heat dissipation from the positive electrode lead terminal 7 and the negative electrode lead terminal 6 is made insufficient, with the result that it is possible for the first short side sealed section 9a or the second short side sealed section 9b to be peeled off when the nonaqueous electrolyte battery is used under an environment of a high temperature and a high humidity. On the other hand, if the cross sectional area S exceeds 2Q, the bonding strength of the first short side sealed section 9a and the second short side sealed section 9b is lowered, with the result that it is possible for the first short side sealed section 9a or the second short side sealed section 9b to be peeled off when the nonaqueous electrolyte battery is used under an environment of a high temperature and a high humidity.

It is more desirable for the cross sectional area S to fall within a range of: $1.2Q \leq S \leq 1.8Q$.

The cross sectional area S is determined as follows. Specifically, the area of the cross section in the short side direction of the positive electrode lead terminal 7 is measured at optional 5 points of the positive electrode lead terminal 7, and the measured values are averaged to determine the cross sectional area S of the positive electrode lead terminal 7. Likewise, the area of the cross section in the short side direction of the negative electrode lead terminal 6 is measured at optional 5 points of the negative electrode lead terminal 6, and the measured values are averaged to determine the cross sectional area S of the negative electrode lead terminal 6.

Where the secondary battery satisfies any of formulas (2) to (4) given below in addition to formula (1) given above, it is possible to further improve the charge-discharge cycle characteristics of the nonaqueous electrolyte secondary battery when the nonaqueous electrolyte secondary battery is subjected to the operation of a high input (rapid charging) and a high output (high rate discharge) under an environment of a high temperature and a high humidity. Incidentally, the effect on the improvement of the characteristics produced by the conditions given in formulas (2) to (4) is produced prominently when the rated capacity Q (Ah) falls within a range of 3 Ah$\leq$Q$\leq$5 Ah. Naturally, it is desirable for the rated capacity Q (Ah) to fall within a range of 3 Ah$\leq$Q$\leq$5 Ah.

It is desirable for the thickness t (mm) of each of the positive electrode lead terminal 7 and the negative electrode lead terminal 6 to satisfy formula (2) given below:

$$0.001Q+0.1 \leq t \leq 0.02Q+1.0 \tag{2}$$

The thickness t (mm) is determined as follows. Specifically, the thickness of the positive electrode lead terminal 7 is measured by, for example, a slide gage at optional 5 points of the positive electrode lead terminal 7 and the measured values are averaged to determine the thickness t of the positive electrode lead terminal 7. Likewise, the thickness of the negative electrode lead terminal 6 is measured by, for example, a slide gage at optional 5 points of the negative electrode lead terminal 6 and the measured values are averaged to determine the thickness t of the negative electrode lead terminal 6.

It is desirable for the width X (mm) of each of the positive electrode lead terminal 7 and the negative electrode lead terminal 6 to satisfy formula (3) given below. Incidentally, the width X denotes the length of the lead terminal in the short side direction.

$$1.2Q \leq X \leq 13Q \tag{3}$$

The width X is determined as follows. Specifically, the length of the positive electrode lead terminal 7 in the short side direction is measured at optional 5 points of the positive electrode lead terminal 7, and the measured values are averaged to determine the width X of the positive electrode lead terminal 7. Likewise, the length of the negative electrode lead terminal 6 in the short side direction is measured at optional 5 points of the negative electrode lead terminal 6, and the measured values are averaged to determine the width X of the negative electrode lead terminal 6.

It is desirable for the distance Y between the outer edge and the inner edge of the heat sealed section to satisfy formula (4) given below:

$$0.1Q+2 \leq Y \leq 0.4Q+10 \tag{4}$$

It is possible for the heat sealed section to be formed on at least one edge (one side) or the entire circumferential region (four sides) of the peripheral region of the case. FIG. 1 referred to previously and FIG. 6 referred to herein later show examples of forming the heat sealed sections on three sides of the peripheral portion of the case. In the case of FIG. 1, the heat sealed sections include the long side sealed section 8, the first short side sealed section 9a and the second short side sealed section 9b. The distance Y between the outer edge $Z_1$ (outer circumference of the case 1) and the inner edge $Z_2$ (boundary line with the sealed section) is measured at optional 5 points of the long side sealed section 8, and the measured values are averaged. Also, the distance Y between the outer edge $Z_1$ (outer circumference of the case 1) and the inner edge $Z_2$ (boundary line with the sealed section) is measured at optional 5 points of the first short side sealed section 9a, and the measured values are averaged. Further, the distance Y between the outer edge $Z_1$ (outer circumference of the case 1) and the inner edge $Z_2$ (boundary line with the sealed section) is measured at optional 5 points of the second short side sealed section 9b, and the measured values are averaged. It is advisable for the average distance Y calculated for each of the long side sealed section 8, the first short side sealed section 9a and the second short side sealed section 9b to satisfy formula (4) given above. It follows that it is possible for the long side sealed section 8, the first short side sealed section 9a and the second short side sealed section 9b to be equal to each other or to differ from each other in the average distance Y.

The negative electrode, the positive electrode, the separator, the nonaqueous electrolyte and the case of the nonaqueous electrolyte battery will now be described in detail.

1) Negative Electrode

The negative electrode comprises a negative. electrode current collector and a negative electrode layer supported by one surface or both surfaces of the current collector. The negative electrode layer contains an active material, a conductive agent and a binder.

When it comes to the negative electrode active material exhibiting the lithium ion insertion potential lower than 0.4V (vs. Li/Li$^+$), e.g., a carbonaceous material and lithium metal, the alloying reaction carried out between lithium and aluminum causes the negative electrode lead terminal and the negative electrode current collector to be finely pulverized. Incidentally, in order to obtain a high voltage, it is desirable for the lithium ion insertion potential of the negative electrode active material to be set to fall within a range of 0.4 to 3V (vs. Li/Li$^+$), more desirably to fall within range of 0.4 to 2V (vs. Li/Li$^+$).

It is desirable for the negative electrode active material to be formed of at least one of a metal oxide, a metal sulfide, a metal nitride and an alloy. Each of the metal oxide, the metal sulfide, the metal nitride and the alloy is capable of absorbing lithium or lithium ions and has a lithium ion insertion potential falling within a range of 0.4 to 3V (vs. Li/Li$^+$).

The metal oxide that can be used as the negative electrode active material includes, for example, a titanium-containing metal composite oxide, an amorphous tin oxide such as $SnB_{0.4}P_{0.6}O_{3.1}$, a tin silicon oxide such as $SnSiO_3$, silicon oxide such as SiO, and tungsten oxide such as $WO_3$. Particularly, it is desirable to use titanium-containing metal composite oxide as the negative electrode active material.

The titanium-containing metal composite oxide noted above includes, for example, lithium-titanium oxide and a titanium-based oxide that does not contain lithium in the synthesizing stage of the oxide. The lithium-titanium oxide noted above includes, for example, lithium titanate having a spinel structure and lithium titanate having a ramsdellite structure. The lithium titanate having the spinel structure can be represented by the chemical formula $Li_{4+x}Ti_5O_{12}$ ($-1 \leq x \leq 3$). The lithium titanate having the ramsdellite structure can be represented by the chemical formula $Li_{2+x}Ti_3O_7$ ($-1 \leq x \leq 3$). The titanium-based oxide noted above includes, for example, $TiO_2$ and a metal composite oxide containing Ti and at least one element selected from the group consisting of P, V, Sn, Cu, Ni and Fe. It is desirable for $TiO_2$ to be of anatase type and to have a low crystallinity caused by a heat treating temperature of 300 to 500° C. The metal composite oxide containing Ti and at least one element selected from the group consisting of P, V, Sn, Cu, Ni and Fe includes, for example, $TiO_2$—$P_2O_5$, $TiO_2$—$V_2O_5$, $TiO_2$—$P_2O_5$—$SnO_2$, and $TiO_2$—$P_2O_5$—MeO (Me denoting at least one element selected from the group consisting of Cu, Ni and Fe). To be more specific, it is desirable for the micro structure of the metal composite oxide to include a crystal phase and an amorphous phase or a single phase formed of an amorphous phase. The particular micro structure makes it possible to improve markedly the charge-discharge cycle performance of the nonaqueous electrolyte battery. Particularly, it is desirable to use lithium-titanium oxide and a metal composite oxide containing Ti and at least one element selected from the group consisting of P, V, Sn, Cu, Ni and Fe.

The metal composite oxide containing Ti and at least one element selected from the group consisting of P, V, Sn, Cu, Ni and Fe denotes a metal composite oxide in which the metal components include Ti and at least one element selected from the group consisting of P, V, Sn, Cu, Ni and Fe.

The metal sulfides used as the negative electrode active material include, for example, titanium sulfide such as $TiS_2$, molybdenum sulfide such as $MoS_2$, and iron sulfides such as FeS, $FeS_2$, and $Li_xFeS_2$.

The metal nitride used as the negative electrode active material includes, for example, lithium-cobalt nitride such as $Li_xCo_yN$ (0<x<4, 0<y<0.5).

If a titanium-containing metal composite oxide is used as the negative electrode active material, it is possible to diminish the change in volume of the negative electrode caused by the charge-discharge cycle of the nonaqueous electrolyte secondary battery to make it possible to further improve the charge-discharge cycle characteristics. Among the titanium-containing metal composite oxides, it is particularly desirable to use lithium titanate having a spinel structure because it is possible to obtain a large capacity.

It is desirable for the average particle diameter of the negative electrode active material to be not larger than 1 μm. If the average particle diameter is not larger than 1 μm, it is possible to improve the charge-discharge cycle performance of the nonaqueous electrolyte secondary battery. Particularly, the effect noted above is rendered prominent in the rapid charging stage and in the high output discharge stage of the secondary battery. It should be noted in this connection that, when it comes to, for example, the negative electrode active material capable of absorbing-releasing lithium ions, the diffusion distance of the lithium ions within the active material is shortened with decrease of the particle diameter to increase the specific surface area of the negative electrode active material. It is more desirable for the average particle diameter of the negative electrode active material to be not larger than 0.3 μm. It should be noted, however, that, if the average particle diameter is excessively small, the particles of the negative electrode active material tend to be agglomerated to lower the homogeneity of the negative electrode. Such being the situation, it is desirable for the lower limit of the particle diameter of the negative electrode active material to be set at 0.001 μm.

The negative electrode active material having an average particle diameter not larger than 1 μm can be obtained by synthesizing an active material precursor from a raw active material, followed by baking and, then, grinding the synthesized active material precursor by using a grinding machine such as a ball mill or jet mill. In the baking process, part of the active material precursor may be aggregated to grow into secondary particles with larger particle size. Hence, it is possible for the negative electrode active material to contain secondary particles. It is easier to grind if the active material precursor is smaller in particle size, and the active material precursor is preferred to be a powder having a particle diameter of 1 μm or less. In the case of using an active material in the form of such fine particles, the lithium ions can be promptly absorbed and released to achieve a high input/output performance. Such being the situation, the secondary battery manufactured by using such an active material is adapted for use in a vehicle.

It is desirable for the current collector of the negative electrode to be formed of aluminum foil or aluminum alloy foil. It is also desirable for the negative electrode current collector to have an average crystal grain size not larger than 50 μm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the negative electrode current collector over a long over-discharge cycle under an environment of a high temperature not lower than, for example, 40° C., it is possible to suppress the elevation in the impedance of the negative electrode. Further, it is possible to improve the high-rate characteristics, the rapid charging properties, and the charge-discharge cycle characteristics of the battery. It is more desirable for the average crystal grain size of the negative electrode current collector to be not larger than 30 μm, furthermore desirably, not larger than 5 μm.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S = 1 \times 10^6/n$ (μm$^2$)", where n denotes the number of crystal grains noted above. Further, the average crystal grain size d (μm) is calculated from the area S by formula (A) given below:

$$d = 2(S/\pi)^{1/2} \tag{A}$$

The aluminum foil or the aluminum alloy foil having the average crystal grain size not larger than 50 μm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 µm, preferably not larger than 15 µm. Also, it is desirable for the aluminum foil to have a purity not lower than 99.99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 100 ppm.

It is possible to use, for example, a carbon material, an aluminum powder or TiO as the conductive agent. The carbon material includes, for example, acetylene black, carbon black, coke, a carbon fiber and graphite. It is more desirable for the conductive agent to be formed of coke obtained by the heat treatment at 800° C. to 2000° C. and having an average particle diameter not larger than 10 µm, graphite, a TiO powder, and a carbon fiber having an average fiber diameter not larger than 1 µm. Further, it is desirable for the carbon material to have a specific surface area not smaller than 10 m²/g as determined by the BET method utilizing the adsorption of $N_2$.

The binder includes, for example, polytetrafluoroethylene (PTFE), polyvinylidene fluoride (PVdF), a fluorinated rubber, a styrene-butadiene rubber, and a core shell binder.

Concerning the mixing ratio of the active material, the conductive agent and the binder contained in the negative electrode, it is desirable for the active material of the negative electrode to be contained in an amount of 80 to 95% by weight, for the conductive agent to be contained in an amount of 3 to 18% by weight, and for the binder to be contained in an amount of 2 to 7% by weight.

The negative electrode can be manufactured by suspending the negative electrode active material, the conductive agent and the binder described above in a suitable solvent, followed by coating the current collector with the resultant suspension and subsequently drying, heat pressing the current collector coated with the suspension.

2) Positive Electrode

The positive electrode comprises a positive electrode current collector and a positive electrode layer supported on one surface or both surfaces of the current collector. The positive electrode layer contains an active material, a conductive agent and a binder.

The positive electrode active material includes, for example, a metal compound, an oxide, a sulfide and a polymer. Particularly, it is desirable to use as the positive electrode active material a metal compound containing lithium and at least one metal element selected from the group consisting of cobalt, nickel, manganese, vanadium and iron.

The metal compound containing lithium and at least one metal element selected from the group consisting of cobalt, nickel, manganese, vanadium and iron denotes a metal compound in which the metal components of the compound include lithium and at least one metal element selected from the group consisting of cobalt, nickel, manganese, vanadium and iron. Also, it is desirable for the metal compound to be capable of absorbing and releasing lithium or lithium ions.

To be more specific, the metal compound includes, for example, a lithium-manganese composite oxide (e.g., $Li_xMn_2O_4$ or $Li_xMnO_2$), a lithium-nickel composite oxide (e.g., $Li_xNiO_2$), a lithium-cobalt composite oxide (e.g., $Li_xCoO_2$), a lithium-nickel-cobalt composite oxide (e.g., $Li_xNi_{1-y}Co_yO_2$), a lithium-manganese-cobalt composite oxide (e.g., $Li_xMn_yCo_{1-y}O_2$), Spinel type lithium-manganese-nickel composite oxide (e.g., $Li_xMn_{2-y}Ni_yO_4$ ($0 \leq x \leq 1$, $0.4 \leq y \leq 1$), lithium-phosphorus oxide having an olivine structure (e.g., $Li_xFePO_4$, $Li_xFe_{1-y}Mn_yPO_4$, $Li_xVPO_4F$, and $Li_xCoPO_4$), and a lithium-nickel-cobalt-manganese composite oxide having a lamellar crystal structure. Incidentally, each of the molar ratios x and y included in the chemical structures given above falls within a range of 0 to 1 unless otherwise specified.

In order to obtain a nonaqueous electrolyte battery excellent in the output performance and having a high voltage, it is desirable to use a lithium-manganese composite oxide, a lithium-nickel composite oxide, a lithium-cobalt composite oxide, a lithium-nickel-cobalt composite oxide, Spinel type lithium-manganese-nickel composite oxide, a lithium-manganese-cobalt composite oxide, a lithium iron phosphate, and a lithium-nickel-cobalt-manganese composite oxide having a lamellar crystal structure.

It is desirable for the lithium-nickel-cobalt-manganese composite oxide having a lamellar crystal structure to be represented by $Li_aNi_bCo_cMn_dO_2$ ($0 \leq a \leq 1.1$, $b+c+d=1$). It is more desirable for the molar ratios a, b, c and d to fall within the ranges of $0 \leq a \leq 1.1$, $0.1 \leq b \leq 0.5$, $0 \leq c \leq 0.9$, $0.1 \leq d \leq 0.5$.

The oxides used as the positive electrode active material include, for example, manganese dioxide ($MnO_2$), iron oxide, copper oxide, nickel oxide, iron sulfate ($Fe_2(SO_4)_3$), and vanadium oxide (e.g., $V_2O_5$) in addition to the oxides of the kinds described above. Further, the polymers used as the positive electrode active material includes, for example, a conductive polymer material such as polyaniline or polypyrrole, and a disulfide based polymer material. It is also possible to use sulfur (S) and a fluorocarbon as the positive electrode active material.

The conductive agent contained in the positive electrode includes, for example, acetylene black, carbon black and graphite.

Further, the binder contained in the positive electrode includes, for example, polytetrafluoro-ethylene (PTFE), polyvinylidene fluoride (PVdF) and a fluorinated rubber.

Concerning the mixing ratio of the active material, the conductive agent and the binder contained in the positive electrode, it is desirable for the positive electrode active material to be contained in an amount of 80 to 95% by weight, for the conductive agent to be contained in an amount of 3 to 19% by weight, and for the binder to be contained in an amount of 1 to 7% by weight.

The positive electrode can be prepared by, for example, suspending the positive electrode active material, the conductive agent and the binder in an appropriate solvent, followed by coating a current collector formed of an aluminum foil or an aluminum alloy foil with the resultant suspension and subsequently drying and pressing the current collector coated with the suspension.

It is desirable for the aluminum foil or the aluminum alloy foil forming the positive electrode current collector to have an average crystal grain size not larger than 50 µm. It is more desirable for the average crystal grain size noted above to be not larger than 30 µm, and furthermore desirably not larger than 5 µm. Where the average crystal grain size of the aluminum foil or the aluminum alloy-foil forming the positive electrode current collector is not larger than 50 µm, the mechanical strength of the aluminum foil or the aluminum alloy foil can be drastically increased so as to make it possible to press the positive electrode with a high pressure. It follows that the density of the positive electrode can be increased so as to increase the battery capacity.

The aluminum foil or the aluminum alloy foil having the average crystal grain size not larger than 50 μm can be affected in a complicated fashion by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm.

3) Separator

A separator can be arranged between the positive electrode and the negative electrode. The separator includes, for example, a porous film including, for example, at least one of polyethylene, polypropylene, cellulose and polyvinylidene fluoride, and an unwoven fabric made of a synthetic resin. Particularly, it is desirable for the separator to be formed of a porous film containing polyethylene or polypropylene in view of the aspect of improving the safety because the particular porous film noted above can be melted at a prescribed temperature so as to break the current.

4) Nonaqueous Electrolyte

The nonaqueous electrolyte includes, for example, a liquid nonaqueous electrolyte prepared by dissolving a lithium salt in an organic solvent, a gel-like nonaqueous electrolyte including the liquid nonaqueous electrolyte and a polymer material, which are in the form of a composite material, and a solid nonaqueous electrolyte including a lithium salt and a polymer material, which are in the form of a composite material. The polymer materials include, for example, polyvinylidene fluoride (PVdF), polyacrylonitrile (PAN) and polyethylene oxide (PEO).

Also, it is possible to permit the nonaqueous electrolyte to contain a room temperature molten salt formed of a non-combustible ionic liquid that is not volatile.

It is desirable for the room temperature molten salt formed of non-combustible ionic liquid to contain lithium ions, organic cations and organic anions. Also, it is desirable for the room temperature molten salt to be in the form of a liquid material under temperature not higher than 100° C., preferably not higher than room temperature.

The lithium salt includes, for example, lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), bistrifluoromethyl sulfonylimide lithium [$LiN(CF_3SO_2)_2$], $LiN(C_2F_5SO_2)_2$, $Li(CF_3SO_2)_3C$ and $LiB[(OCO)_2]_2$. It is possible to use a single kind of the lithium salt or a plurality of different kinds of the lithium salt simultaneously in combination.

Particularly, lithium tetrafluoroborate, which produces a prominent effect of suppressing the hydrolysis of the nonaqueous electrolyte, makes it possible to further improve the charge-discharge cycle life of the battery.

It is desirable for the lithium salt to be dissolved in the organic solvent in an amount of 0.5 to 2 mol/L.

The organic solvent noted above includes, for example, cyclic carbonates such as propylene carbonate (PC), ethylene carbonate (EC); linear carbonates such as diethyl carbonate (DEC), dimethyl carbonate (DMC), and methyl ethyl carbonate (MEC); linear ethers such as dimethoxy ethane (DME), and diethoxy ethane (DEE); cyclic ethers such as tetrahydrofuran (THF), dioxolane (DOX); as well as γ-butyrolactone (GBL), acetonitrile (AN), and sulfolane (SL). These organic solvents can be used singly or in the form of a mixture of a plurality of the organic solvents exemplified above.

Particularly, it is desirable to use an organic solvent containing at least one kind of the compound selected from the group consisting of PC, EC, DEC and GBL. In the case of using the particular organic solvent, it is possible to improve the output characteristics or the charge-discharge cycle life of the battery. In order to improve the characteristics sufficiently, it is desirable to select at least two kinds of organic solvents from the group consisting of PC, EC, DEC and GBL.

The construction of the nonaqueous electrolyte battery according to the first embodiment of the present invention is not limited to the construction shown in FIGS. 1 to 5. For example, it is possible for the nonaqueous electrolyte battery to be constructed as shown in FIG. 6, which is an oblique view, partly broken away, schematically showing the construction of another flat type nonaqueous electrolyte secondary battery according to the first embodiment of the present invention.

Figure 6:
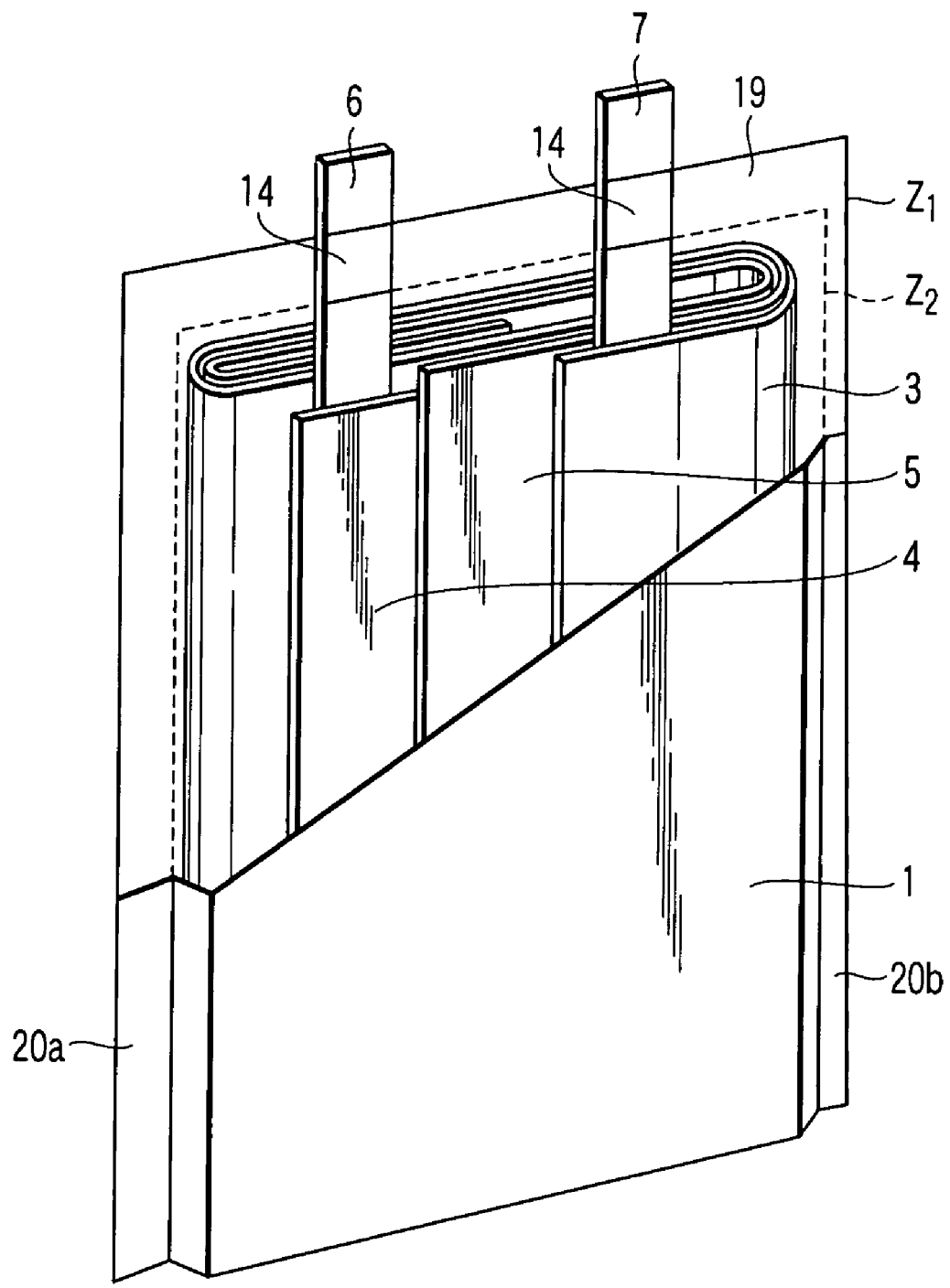
FIG. 6 is an oblique view, partly broken away, schematically showing the construction of another flat type nonaqueous electrolyte secondary battery according to the first embodiment of the present invention.

As shown in FIG. 6, the electrode group comprises a laminate structure including a positive electrode 3, a negative electrode 4 and a separator 5 interposed between the positive electrode 3 and the negative electrode 4. The laminate structure is spirally wound in a manner to have a flattened shape. The electrode group of the particular construction can be manufactured by spirally winding a laminate structure consisting of a positive electrode 3, a negative electrode 4 and a separator 5 interposed between the positive electrode 3 and the negative electrode 4 such that the wound laminate structure has a flattened shape, followed by applying a thermal pressing to the wound laminate structure. It is possible for the positive electrode 3, the negative electrode 4 and the separator 5 included in the electrode group to be made integral by using a polymer having an adhesivity. A band-like positive electrode lead terminal 7 is electrically connected to the positive electrode 3. On the other hand, a band-like negative electrode lead terminal 6 is electrically connected to the negative electrode 4. The electrode group is housed in the case 1 formed of a laminate film. The case 1 can be obtained by having the electrode group sandwiched between the two folded portions of the laminate film, followed by applying a heat seal to the overlapping portions of the folded laminate film. The case 1 includes a short side sealed section 19 and long side sealed section 20a, 20b. The tip portions of the positive electrode lead terminal 7 and the negative electrode lead terminal 6 are withdrawn to the outside through the short side sealed section 19 of the case 1.

In order to improve the charge-discharge cycle life of the battery, it is desirable for the battery to be constructed such that the positive electrode lead terminal and the negative electrode lead terminal are withdrawn to the outside through the corresponding heat sealed sections. It should be noted in this connection that, in this case, it is possible to secure a sufficient width of each of the positive electrode lead terminal and the negative electrode lead terminal to make the battery excellent in the heat dissipating properties, leading to the improved charge-discharge cycle life of the battery.

Second Embodiment

A battery pack according to a second embodiment of the present invention comprises a plurality of unit cells each formed of the nonaqueous electrolyte battery according to the first embodiment of the present invention. The unit cells are electrically connected in series or in parallel to form a battery module.

The unit cell according to the first embodiment of the present invention is adapted for forming the battery module, and the battery pack according to the second embodiment of the present invention is excellent in the charge-discharge cycle characteristics, as described in the following.

The unit cell according to the first embodiment of the present invention permits maintaining a high air-tightness over a long time to make it possible to diminish the difference in the capacity and the difference in impedance among the individual batteries. As a result, when the battery module comprising a plurality of unit cells that are connected in series is charged full, it is possible to suppress the unevenness of the battery voltage of the unit cells derived from the difference in the battery capacity among the individual unit cells. It follows that the battery pack according to the second embodiment of the present invention is able to control the battery module voltage easily and makes it possible to improve the charge-discharge cycle characteristics of the battery pack.

The flat type battery shown in FIG. 1 or FIG. 6 can be used the unit cell.

Figure 7:
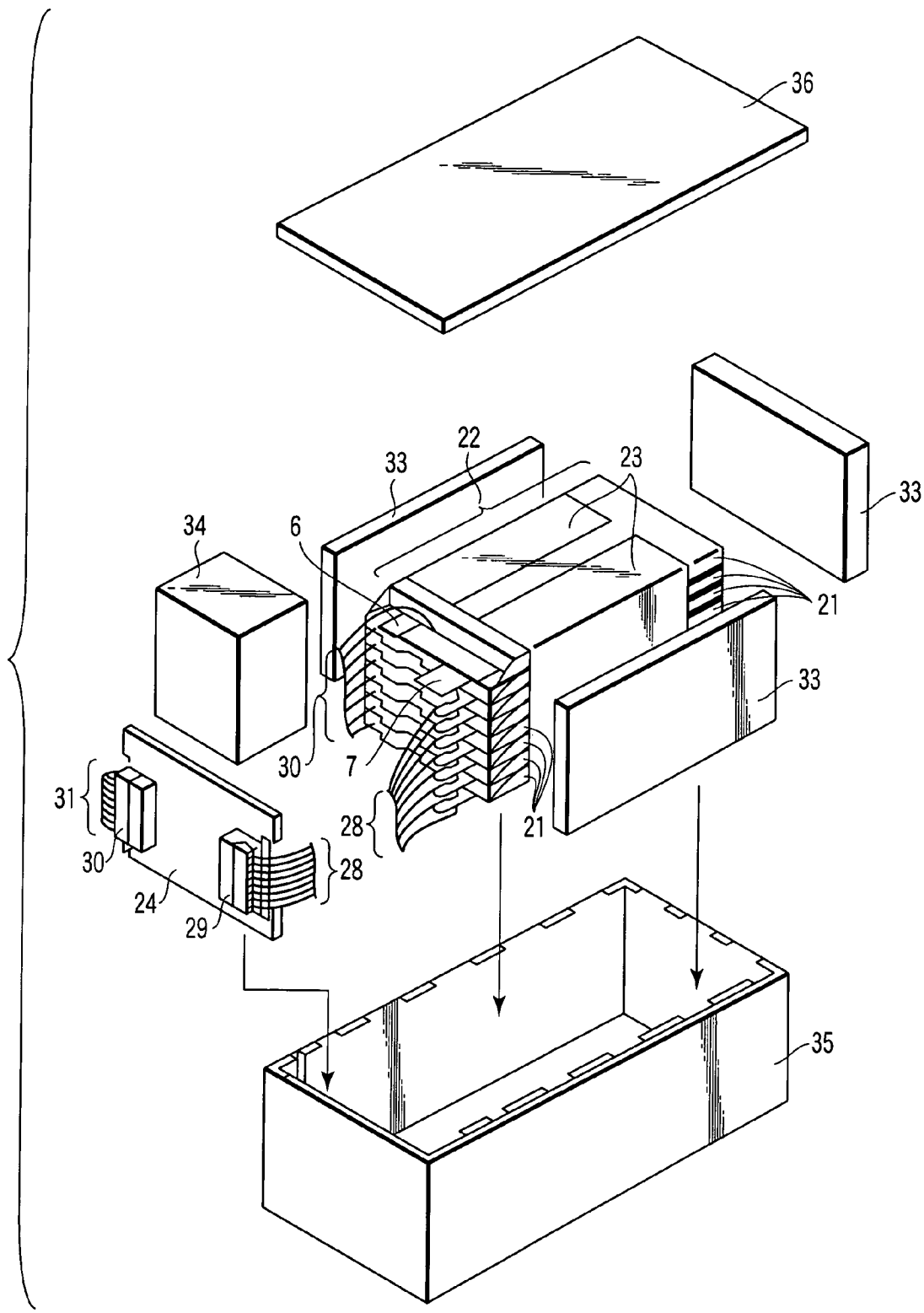
FIG. 7 is an oblique view showing in a dismantled fashion the construction of a battery pack according to a second embodiment of the present invention.
Figure 8:
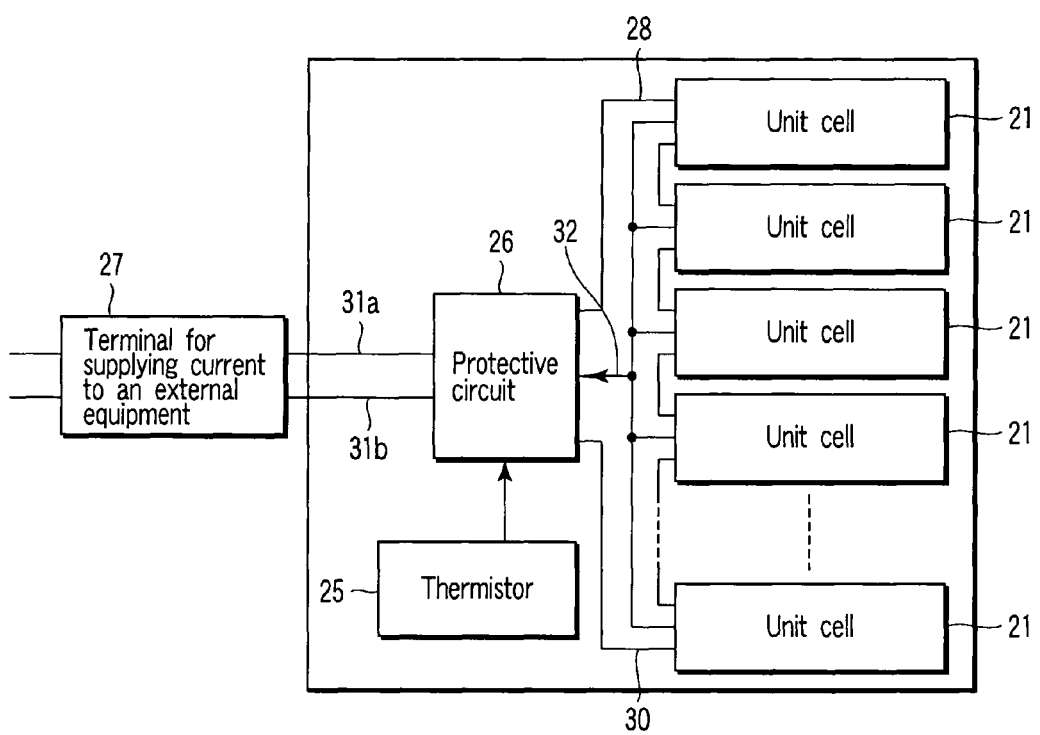
FIG. 8 is a block diagram showing the electric circuit of the battery pack shown in FIG. 7.

Each of a plurality of unit cells 21 included in the battery pack shown in FIG. 7 is formed of a flattened type nonaqueous electrolyte battery constructed as shown in FIG. 6. The plural unit cells 21 are stacked one upon the other in the thickness direction in a manner to align the protruding directions of the positive electrode terminals and the negative electrode terminals. As shown in FIG. 8, the unit cells 21 are connected in series so as to form a battery module 22. The unit cells 21 forming the battery module 22 are made integral by using an adhesive tape 23.

A printed wiring board 24 is arranged on the side surface of the battery module 22 toward which protrude the positive electrode terminals 7 and the negative electrode terminals 6. As shown in FIG. 8, a thermistor 25, a protective circuit 26 and a terminal 27 for current supply to the external equipment are connected to the printed wiring board 24.

As shown in FIGS. 7 and 8, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium electrodes used as reference electrodes are inserted into the unit cells 21.

The nonaqueous electrolyte battery according to the first embodiment of the present invention is particularly adapted for use in the case where the protective circuit detects the battery voltage because the positive electrode potential or the negative electrode potential in the nonaqueous electrolyte battery can be controlled easily by the detection of the battery voltage.

In the case of FIG. 8, a wiring 32 is connected to each of the unit cells 21 for detecting the voltage, and the detection signal is transmitted through these wiring 32 to the protective circuit 26. Specifically, the protective circuit 26 is provided with a battery voltage monitoring circuit section. Each of the unit cells 21 is connected to the battery voltage monitoring circuit section via a wiring 32. According to the particular construction, the battery voltage of each of the unit cells 21 can be detected by the protective circuit 26.

Further, in the case shown in FIG. 8, all the unit cells 21 included in the battery module 22 are detected in terms of voltage. Although it is particularly preferable that the voltages of all of the unit cells 21 of the battery module 22 should be detected, it may be sufficient to check the voltages of only some of the unit cells 21.

Protective sheets 33 each formed of rubber or resin are arranged on the three of the four sides of the battery module 22, though the protective sheet 33 is not arranged on the side toward which protrude the positive electrode terminals 7 and the negative electrode terminals 6. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along the other short side of the container 35. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk so as to fix the battery module 22.

The unit cells 21 shown in FIGS. 7 and 8 are connected in series. However, it is also possible to connect the unit cells 21 in parallel so as to increase the cell capacity. Of course, it is possible to connect the battery packs in series and in parallel.

Also, the construction of the battery pack can be changed appropriately depending on the use of the battery pack.

It is desirable for the battery pack to be used under a high temperature environment. To be more specific, the battery pack can be mounted to, for example, vehicles such as a hybrid electric automobile having two to four wheels, an electric automobile having two to four wheels, and an assistant bicycle. And the battery pack can be mounted as an emergency power supply of an electronic device.

Incidentally, when mounted to a vehicle, the battery pack is required to exhibit good charge-discharge cycle characteristics under a high temperature environment of about 60° C. Also, when used as an emergency power supply of an electronic device, the battery pack is required to exhibit good charge-discharge cycle characteristics under a high temperature environment of about 45° C. As demonstrated in the Examples described in the following, the battery pack of the examples permits improving the charge-discharge cycle characteristics under a high temperature environment of 60° C. and, thus, can be suitably mounted to the vehicle and can be used for the emergency power supply of the electronic device. Particularly, it is desirable to mount the battery pack to a vehicle.

Examples of the present invention will now be described with reference to the accompanying drawings. Needless to say, the present invention is not limited to the following Examples.

Example 1

The negative electrode was prepared as follows. In the first step, prepared was a mixture consisting of 90 parts by weight of lithium titanate ($Li_4Ti_5O_{12}$) powder having a spinel structure, an average particle diameter of 0.5 µm, 20 $m^2$/g of a specific surface area as determined by the BET method using a $N_2$ gas, and exhibiting a lithium ion insertion potential of 1.55V (vs. Li/$Li^+$), 7 parts by weight of carbon powder used as a conductive agent and having an average particle diameter of 4 µm, and 3 parts by weight of polyvinylidene fluoride (PVdF) used as a binder. The mixture was dispersed in n-methyl pyrrolidone (NMP) to obtain a slurry. Then, an aluminum foil (99% of purity) having a thickness of 10 µm and an average crystal grain diameter of 50 µm was coated with the slurry thus obtained, followed by drying the aluminum foil coated with the slurry and subsequently applying a hot press to the dried aluminum foil to manufacture a negative electrode having an electrode density of 2.4 g/$cm^3$.

Also, a negative electrode lead terminal was manufactured as follows. Specifically, an aluminum alloy foil (purity of 99%) having a thickness t of 0.15 mm, a width X of 12 mm, a height of 30 mm, a cross sectional area S of 1.8 $mm^2$, and containing 0.5% of Mg was dipped in an aqueous solution consisting of sodium dichromate and phosphoric acid to apply a surface treatment with dichromic acid, thereby forming a second alumina layer having a thickness of 1 µm and also having projections and recesses. The second alumina layer thus formed was porous as shown in FIG. 5. The first seal portion of the negative electrode lead terminal thus obtained, which was bonded to the case, was covered with a polyethylene film used as a thermoplastic film, followed by applying a heat treatment to the polyethylene film to permit the polyethylene film to have adhered to the negative electrode lead terminal.

On the other hand, the positive electrode was manufactured as follows. In the first step, prepared was a lithium-nickel-cobalt-manganese composite oxide ($LiNi_{1/3}Co_{1/3}Mn_{1/3}O_2$) of a lamellar structure having an average particle diameter of 3 µm. Then, the composite oxide thus prepared was mixed with a graphite powder used as a conductive agent in an amount of 8% by weight based on the amount of the entire positive electrode and with PVdF used as a binder in an amount of 5% by weight based on the entire amount of the positive electrode. The mixture thus obtained was dispersed in n-methyl pyrrolidone (NMP) solvent to prepare a slurry. Both surfaces of an aluminum alloy foil (purity of 99%) having a thickness of 15 µm and also having an average crystal grain diameter of 10 µm were coated with the resultant slurry, followed by drying and subsequently pressing the dried aluminum alloy foil to manufacture a positive electrode having an electrode density of 3.5 g/$cm^3$.

Further, a positive electrode lead terminal was manufactured as follows. Specifically, an aluminum alloy foil (purity of 99%) having a thickness t of 0.15 mm, a width X of 12 mm, a height of 30 mm, a cross sectional area S of 1.8 $mm^2$, and containing 0.5% of Mg was dipped in an aqueous solution consisting of sodium dichromate and phosphoric acid to apply a surface treatment to the aluminum alloy foil with dichromic acid, thereby forming a first porous alumina layer having a thickness of 0.1 µm and also having projections and recesses. The first alumina layer thus formed was porous as shown in FIG. 5. The first seal portion of the positive electrode lead terminal thus obtained, which was bonded to the case, was covered with a polyethylene film used as a thermoplastic film, followed by applying a heat treatment to the polyethylene film to permit the polyethylene film to have adhered to the positive electrode lead terminal.

The positive electrode and the negative electrode thus obtained were alternately laminated one upon the other with a separator made of a porous polyethylene film and having a thickness of 12 µm interposed between the positive electrode and the negative electrode to obtain a laminated electrode group. The negative electrode lead terminal manufactured by the method described above was electrically connected to the negative electrode current collector. Also, the positive electrode lead terminal was electrically connected to the positive electrode current collector.

The laminate film used for forming the case had a thickness of 0.1 mm. Also, the laminate film included an aluminum layer having a thickness of about 0.03 mm and also having an average crystal grain diameter of 100 µm, a polyethylene terephthalate (PET) film formed on one surface of the aluminum layer, and a polyethylene (PE) film formed on the opposite surface of the aluminum layer. The distance Y between the outer edge and the inner edge of the heat sealed section was set at 4 mm in each of the first short side sealed section from which the negative electrode lead terminal was withdrawn to the outside, the second short side sealed section from which the positive electrode lead terminal was withdrawn to the outside, and the long side sealed section.

On the other hand, a liquid nonaqueous electrolyte was prepared by dissolving lithium tetrafluoroborate ($LiBF_4$) in an amount of 2.0 mol/L in a mixed solvent prepared by mixing ethylene carbonate (EC) and γ-butyrolactone (GBL) in a volume ratio of 25:75.

The nonaqueous electrolyte thus prepared was poured into the electrode group housed in the case to manufacture a flat type nonaqueous electrolyte battery constructed as shown in FIG. 1, having a rated capacity Q of 3 Ah, a thickness of 6.8 mm, a width of 72 mm and a height of 110 mm.

Since the rated capacity Q was 3 Ah, the allowable range of the cross sectional area S was 1.8 $mm^2$ to 6 $mm^2$ based on formula (1) given previously. The value of 1.8 $mm^2$ of the cross sectional area for Example 1 corresponds to 0.6Q. The allowable range of the thickness t of each of the positive electrode lead terminal and the negative electrode lead terminal was 0.103 mm to 1.06 mm based on formula (2) given previously. The allowable range of the width X of each of the positive electrode lead terminal and the negative electrode lead terminal was 3.6 mm to 39 mm based on formula (3) given previously. Further, the allowable range of the distance Y between the outer edge and the inner edge of the heat sealed section is 2.3 mm to 11.2 mm based on formula (4) given previously.

The measuring methods of the particle diameter of the negative electrode active material and the lithium ion insertion potential will now be described.

<Particle Diameter>

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, so as to analyze the particle size distribution data.

<Lithium Ion Insertion Potential>

The negative electrode was cut into small pieces each sized at 1 cm×1 cm so as to obtain working electrodes. The working electrode was disposed to face a counter electrode formed of a lithium metal foil sized at 2 cm×2 cm with a glass filter (separator) interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 50 mL of an electrolysis solution, which was prepared by dissolving $LiBF_4$ in a concentration of 2 mol/L in a mixed solvent prepared by mixing EC and GBL in a mixing ratio by volume of 25:75, was poured into the glass cell such that the separator and the electrodes were sufficiently impregnated with the electrolysis solution, followed by hermetically closing the glass cell. The glass cell thus manufactured was arranged in a constant temperature bath maintained at 25° C. so as to measure the lithium ion insertion potential of the working electrode at the time when the glass cell was charged with a current density of 0.1 mA/cm². Incidentally, a constant temperature bath type No. EC-45 MTP manufactured by Hitachi Ltd. was used as the constant temperature bath.

Examples 2 to 22 and Comparative Examples 1 to 11

Flat type nonaqueous electrolyte batteries were manufactured as in Example 1, except that the rated capacity Q, the cross sectional area S, the lead thickness, the lead width and the width of the heat sealed sections were set as shown in Tables 1 to 2.

In Examples 11 to 13 and Comparative Examples 4 and 5, the rated capacity was 1 Ah and, thus, the allowable range of the cross sectional area S was 0.6 mm² to 2 mm² based on formula (1) given previously. The cross sectional area S of 0.6 mm² for Example 1 corresponds to 0.6Q of the rated capacity Q. The allowable range of the thickness t of each of the positive electrode lead terminal and the negative electrode lead terminal was 0.101 mm to 1.02 mm based on formula (2) given previously. The allowable range of the width X of each of the positive electrode lead terminal and the negative electrode lead terminal was 1.2 mm to 13 mm based on formula (3) given previously. Further, the allowable range of the distance Y between the outer edge and the inner edge of the heat sealed section was 2.1 mm to 10.4 mm based on formula (4) given previously.

The rated capacity Q for each of Examples 14 to 16 and Comparative Examples 6 and 7 was 5 Ah. Therefore, the allowable range of the cross sectional area S was 3 mm² to 10 mm² based on formula (1) given previously. For example, the cross sectional area for Example 14 was 3 mm², which corresponds to 0.6Q of the rated capacity Q. The allowable range of the thickness t of each of the positive electrode lead terminal and the negative electrode lead terminal was 0.105 mm to 1.1 mm based on formula (2) given previously. The allowable range of the width X of each of the positive electrode lead terminal and the negative electrode lead terminal was 6 mm to 65 mm based on formula (3) given previously. Further, the allowable range of the distance Y between the outer edge and the inner edge of the heat sealed section was 2.5 mm to 12 mm based on formula (4) given previously.

The rated capacity Q for each of Examples 17 to 19 and Comparative Examples 8 and 9 was 10 Ah. Therefore, the allowable range of the cross sectional area S was 6 mm² to 20 mm² based on formula (1) given previously. For example, the cross sectional area for Example 17 was 6 mm², which corresponds to 0.6Q of the rated capacity Q. The allowable range of the thickness t of each of the positive electrode lead terminal and the negative electrode lead terminal was 0.11 mm to 1.2 mm based on formula (2) given previously. The allowable range of the width X of each of the positive electrode lead terminal and the negative electrode lead terminal was 12 mm to 130 mm based on formula (3) given previously. Further, the allowable range of the distance Y between the outer edge and the inner edge of the heat sealed section was 3 mm to 14 mm based on formula (4) given previously.

Further, the rated capacity Q for each of Examples 20 to 22 and Comparative Examples 10 and 11 was 50 Ah. Therefore, the allowable range of the cross sectional area S was 30 mm² to 100 mm² based on formula (1) given previously. For example, the cross sectional area for Example 20 was 30 mm², which corresponds to 0.6Q of the rated capacity Q. The allowable range of the thickness t of each of the positive electrode lead terminal and the negative electrode lead terminal was 0.15 mm to 2 mm based on formula (2) given previously. The allowable range of the width X of each of the positive electrode lead terminal and the negative electrode lead terminal was 60 mm to 650 mm based on formula (3) given previously. Further, the allowable range of the distance Y between the outer edge and the inner edge of the heat sealed section was 7 mm to 30 mm based on formula (4) given previously.

The charge-discharge cycle life of the nonaqueous electrolyte secondary battery was evaluated by conducting a rapid charging-over discharge cycle test under an environment of a high temperature and a high humidity. To be more specific, the nonaqueous electrolyte secondary battery was charged under an environment of a high humidity (90%) and a high temperature (60° C.) with a constant voltage of 2.8V (maximum current rate of 10C) for 6 minutes, followed by discharging the nonaqueous electrolyte secondary battery to 0V under a constant current rate of 5C. The rapid charging-over discharge cycle test was continued until the capacity retention ratio was lowered to 80%. Tables 1 and 2 show the experimental data. It should be noted that the cycle life given in each of Tables 1 and 2 denotes the number of charge-discharge cycles that were performed until the capacity retention ratio of the nonaqueous electrolyte secondary battery was lowered to 80%.

TABLE 1

| | Rated capacity Q (Ah) | Cross sectional area S | Lead thickness t (mm) | Lead width X (mm) | Heat sealed section width Y (mm) | Cycle life |
|---|---|---|---|---|---|---|
| Example 1 | 3 | 0.6Q | 0.15 | 12 | 4 | 500 |
| Example 2 | 3 | 1.2Q | 0.2 | 18 | 4 | 800 |
| Example 3 | 3 | 1.67Q | 0.2 | 25 | 4 | 1000 |
| Example 4 | 3 | 1.8Q | 0.2 | 27 | 4 | 900 |
| Example 5 | 3 | 2Q | 0.2 | 30 | 4 | 500 |
| Example 6 | 3 | 1.27Q | 1.06 | 3.6 | 4 | 1300 |
| Example 7 | 3 | 1.34Q | 0.103 | 39 | 4 | 850 |
| Example 8 | 3 | 1.73Q | 0.133 | 39 | 4 | 900 |
| Example 9 | 3 | 1.67Q | 0.2 | 25 | 11.2 | 1500 |
| Example 10 | 3 | 0.67Q | 0.2 | 10 | 2.3 | 900 |
| Comparative Example 1 | 3 | 0.55Q | 0.11 | 15 | 2 | 200 |
| Comparative | 3 | 2.1Q | 0.15 | 42 | 4 | 300 |

TABLE 1-continued

| | Rated capacity Q (Ah) | Cross sectional area S | Lead thickness t (mm) | Lead width X (mm) | Heat sealed section width Y (mm) | Cycle life |
|---|---|---|---|---|---|---|
| Example 2 | | | | | | |
| Comparative Example 3 | 0.8 | 2.5Q | 0.2 | 10 | 2 | 350 |

TABLE 2

| | Rated capacity Q (Ah) | Cross sectional area S | Lead thickness t (mm) | Lead width X (mm) | Heat sealed section width Y (mm) | Cycle life |
|---|---|---|---|---|---|---|
| Example 11 | 1 | 0.6Q | 0.12 | 5 | 2.1 | 550 |
| Example 12 | 1 | 0.75Q | 0.15 | 5 | 2.1 | 600 |
| Example 13 | 1 | 2Q | 0.2 | 10 | 2.1 | 400 |
| Comparative Example 4 | 1 | 0.5Q | 0.05 | 10 | 2 | 150 |
| Comparative Example 5 | 1 | 2.1Q | 0.12 | 17.5 | 2 | 150 |
| Example 14 | 5 | 0.6Q | 0.12 | 25 | 5 | 500 |
| Example 15 | 5 | 1.2Q | 0.2 | 30 | 5 | 1000 |
| Example 16 | 5 | 2Q | 0.2 | 50 | 5 | 800 |
| Comparative Example 6 | 5 | 0.5Q | 0.05 | 50 | 3 | 300 |
| Comparative Example 7 | 5 | 2.1Q | 0.2 | 52.5 | 2 | 250 |
| Example 17 | 10 | 0.6Q | 0.3 | 20 | 5 | 500 |
| Example 18 | 10 | 1.2Q | 0.3 | 40 | 5 | 1000 |
| Example 19 | 10 | 2Q | 0.4 | 50 | 5 | 500 |
| Comparative Example 8 | 10 | 0.5Q | 0.10 | 50 | 3 | 150 |
| Comparative Example 9 | 10 | 2.1Q | 0.21 | 100 | 2 | 250 |
| Example 20 | 50 | 0.6Q | 0.5 | 60 | 10 | 500 |
| Example 21 | 50 | 1.8Q | 1.5 | 60 | 10 | 1000 |
| Example 22 | 50 | 2Q | 1.0 | 100 | 10 | 800 |
| Comparative Example 10 | 50 | 0.5Q | 0.5 | 50 | 5 | 150 |
| Comparative Example 11 | 50 | 2.1Q | 1.0 | 145 | 5 | 250 |

The experimental data given in Table 1 support that the nonaqueous electrolyte secondary battery for each of Examples 1 to 10, in which the cross sectional area S of each of the positive electrode lead terminal and the negative electrode lead terminal satisfied the condition of $0.6Q \leq S \leq 2Q$, was excellent in the charge-discharge cycle life under an environment of a high temperature and a high humidity.

On the other hand, in the battery for Comparative Example 1, the cross sectional area S was smaller than 0.6Q. In the battery for Comparative Example 2, the cross sectional area S exceeded 2Q. Further, in the battery for Comparative Example 3, the rated capacity Q was smaller than 1 Ah. In the battery for each of these Comparative Examples, the charge-discharge cycle life under an environment of a high temperature and a high humidity was found to be shorter than that for each of Examples 1 to 10.

Concerning the cross sectional area S, the nonaqueous electrolyte secondary battery for each of Examples 2 to 4 satisfied the condition of $1.2Q \leq S \, 1.8Q$. On the other hand, the nonaqueous electrolyte secondary battery for each of Examples 1 and 5 failed to satisfy the above-noted condition of the cross sectional area S. As apparent from the experimental data given in Table 1, the charge-discharge cycle life of the nonaqueous electrolyte secondary battery for each of Examples 2 to 4 was found to be longer than that for the nonaqueous electrolyte secondary battery for each of Examples 1 and 5. The experimental data clearly support that it is desirable for the cross sectional area S to satisfy the condition of $1.2Q \leq S \leq 1.8Q$ in order to obtain a particularly excellent charge-discharge cycle life.

Concerning the thickness t of each of the positive electrode lead terminal and the negative electrode lead terminal, the experimental data for Examples 1 to 10 support that a long charge-discharge cycle life can be obtained when the thickness t falls within the range defined in formula (2) given previously.

Concerning the width X of each of the positive electrode lead terminal and the negative electrode lead terminal, the experimental data for Examples 1 to 10 support that a long charge-discharge cycle life can be obtained when the width X falls within the range defined in formula (3) given previously.

Further, concerning the distance Y between the outer edge and the inner edge of the heat sealed section, the experimental data for Examples 1 to 10 support that a long charge-discharge cycle life can be obtained when the distance Y falls within the range defined in formula (4) given previously.

The experimental data given Table 2 support that the nonaqueous electrolyte secondary battery for each of Examples 11 to 22, which satisfied the condition of the cross sectional area S, i.e., the condition of $0.6Q \leq S \leq 2Q$, was superior to the nonaqueous electrolyte secondary battery for each of Comparative Examples 4 to 11, which failed to satisfy the condition of the cross sectional area S noted above, in the charge-discharge cycle life under an environment of a high temperature and a high humidity, when the rated capacity Q was changed from 1 Ah to 5 Ah, to 10 Ah and to 50 Ah.

As pointed out above, it has been clarified by the experimental data that the charge-discharge cycle life of the nonaqueous electrolyte battery can be improved under an environment of a high temperature and a high humidity when the cross sectional area S of each of the positive electrode lead terminal and the negative electrode lead terminal satisfies the condition of $0.6Q \leq S \leq 2Q$.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery, comprising:
   a case formed of a film and including a heat sealed section formed on an edge portion of the case;
   a nonaqueous electrolyte provided in the case;
   a positive electrode provided in the case and containing a positive electrode current collector formed of an aluminum foil or an aluminum alloy foil;
   a negative electrode provided in the case and containing a negative electrode active material having a lithium ion insertion potential not lower than 0.4 V (vs. Li/Li$^+$), and the negative electrode containing a negative electrode current collector formed of an aluminum foil or an aluminum alloy foil;
   a positive electrode terminal including a tip portion withdrawn to an outside of the case via the heat sealed section of the case, and a seal portion being positioned in the heat sealed section, and the positive electrode terminal being made of aluminum or aluminum alloy and electrically connected to the positive electrode;

a first alumina layer having projections and recesses and formed on the seal portion of the positive electrode terminal;

a negative electrode terminal including a tip portion withdrawn to the outside of the case via the heat sealed section of the case, and a seal portion being positioned in the heat sealed section, and the negative electrode terminal being made of aluminum or aluminum alloy and electrically connected to the negative electrode; and a second alumina layer having projections and recesses and formed on the seal portion of the negative electrode terminal, wherein the positive electrode terminal and the negative electrode terminal have a cross sectional area S (mm$^2$) which satisfies the formula (1) given below:

$$0.6Q \leq S \leq 2Q \tag{1}$$

where Q denotes a rated capacity (Ah) of the nonaqueous electrolyte battery, which falls within a range of 1 to 50 Ah.

2. The nonaqueous electrolyte battery according to claim 1, wherein the positive electrode terminal and the negative electrode terminal have a thickness t (mm) which satisfies the formula (2) given below:

$$0.001Q+0.1 \leq t \leq 0.02Q+1.0 \tag{2}$$

where Q denotes the rated capacity (Ah) of the nonaqueous electrolyte battery, which falls within a range of 1 to 50 Ah.

3. The nonaqueous electrolyte battery according to claim 1, wherein the positive electrode terminal and the negative electrode terminal have a width X (mm) which satisfies the formula (3) given below:

$$1.2Q \leq X \leq 13Q \tag{3}$$

where Q denotes the rated capacity (Ah) of the nonaqueous electrolyte battery, which falls within a range of 1 to 50 Ah.

4. The nonaqueous electrolyte battery according to claim 1, which the case has a distance Y (mm) between an outer edge and an inner edge of the heat sealed section, which satisfies the formula (4) given below:

$$0.1Q+2 \leq Y \leq 0.4Q+10 \tag{4}$$

where Q denotes the rated capacity (Ah) of the nonaqueous electrolyte battery, which falls within a range of 1 to 50 Ah.

5. The nonaqueous electrolyte battery according to claim 1, wherein:

the heat sealed section includes a first sealed section formed at one edge portion of the case and a second sealed section formed at another edge portion opposite to said one edge portion;

the tip portion of the negative electrode terminal is withdrawn to the outside of the case through the first sealed section; and the tip portion of the positive electrode terminal is withdrawn to the outside of the case through the second sealed section.

6. The nonaqueous electrolyte battery according to claim 1, wherein the negative electrode active material includes a titanium-containing metal composite oxide.

7. The nonaqueous electrolyte battery according to claim 6, wherein the titanium-containing metal composite oxide includes lithium-titanium oxide having a spinel structure.

8. The nonaqueous electrolyte battery according to claim 6, wherein the titanium-containing metal composite oxide contains at least one element selected from the group consisting of P, V, Sn, Cu, Ni and Fe.

9. The nonaqueous electrolyte battery according to claim 1, wherein the rated capacity Q falls within a range of 5 to 50 Ah.

10. The nonaqueous electrolyte battery according to claim 1, wherein the positive electrode terminal and the negative electrode terminal have the cross sectional area S (mm$^2$) which satisfies the formula (1a) given below:

$$1.2Q \leq S \leq 1.8Q \tag{1a}$$

where Q denotes the rated capacity (Ah) of the nonaqueous electrolyte battery, which falls within a range of 1 to 50 Ah.

11. The nonaqueous electrolyte battery according to claim 1, wherein the film forming the case comprising a thermoplastic resin layer, a resin layer, and an aluminum layer or an aluminum alloy layer arranged between the thermoplastic resin layer and the resin layer.

12. The nonaqueous electrolyte battery according to claim 1, which further comprises:

a thermoplastic film covering the first alumina layer and second alumina layer.

13. The nonaqueous electrolyte battery according to claim 1, wherein the positive electrode contains a compound represented by $Li_a Ni_b Co_c Mn_d O_2$ (where the molar ratios a, b, c, and d are: $0 \leq a \leq 1.1$, $0.1 \leq b \leq 0.5$, $0 \leq c \leq 0.9$, $0.1 \leq d \leq 0.5$).

14. The nonaqueous electrolyte battery according to claim 1, wherein the negative electrode active material is formed of particles having an average particle diameter not larger than 1 μm.

15. The nonaqueous electrolyte battery according to claim 1, wherein each of the aluminum foil and the aluminum alloy foil has an average crystal grain size not larger than 50 μm.

16. The nonaqueous electrolyte battery according to claim 1, wherein the nonaqueous electrolyte comprises at least two kinds of nonaqueous solvents selected from the group consisting of propylene carbonate, ethylene carbonate, diethyl carbonate, and γ-butyrolactone.

17. A battery pack comprising a battery module comprising nonaqueous electrolyte batteries, each of the nonaqueous electrolyte batteries comprising:

a case formed of a film and including a heat sealed section formed on an edge portion of the case;

a nonaqueous electrolyte provided in the case;

a positive electrode provided in the case and containing a positive electrode current collector formed of an aluminum foil or an aluminum alloy foil;

a negative electrode provided in the case and containing a negative electrode active material having a lithium ion insertion potential not lower than 0.4 V (vs. Li/Li$^+$), and the negative electrode containing a negative electrode current collector formed of an aluminum foil or an aluminum alloy foil;

a positive electrode terminal including a tip portion withdrawn to an outside of the case via the heat sealed section of the case, and a seal portion being positioned in the heat sealed section, and the positive electrode terminal being made of aluminum or aluminum alloy and electrically connected to the positive electrode;

a first alumina layer having projections and recesses and formed on the seal portion of the positive electrode terminal;

a negative electrode terminal including a tip portion withdrawn to the outside of the case via the heat sealed section of the case, and a seal portion being positioned in the heat sealed section, and the negative electrode terminal being made of aluminum or aluminum alloy and electrically connected to the negative electrode; and a second alumina layer having projections and recesses and formed on the seal portion of the negative electrode terminal, wherein the positive electrode terminal and the negative electrode terminal have a cross sectional area S (mm$^2$) which satisfies the formula (1) given below:

$$0.6Q \leqq S \leqq 2Q \tag{1}$$

where Q denotes a rated capacity (Ah) of the nonaqueous electrolyte battery, which falls within a range of 1 to 50 Ah.

18. The battery pack according to claim 17, further comprising:

a protective circuit which detects a voltage of the nonaqueous electrolyte batteries.

19. A vehicle comprising a battery pack defined in claim 17.

* * * * *